W. C. STARKEY.
METHOD OF APPLYING RAIL BONDS.
APPLICATION FILED JUNE 26, 1916.
1,336,931. Patented Apr. 13, 1920.
2 SHEETS—SHEET 1.
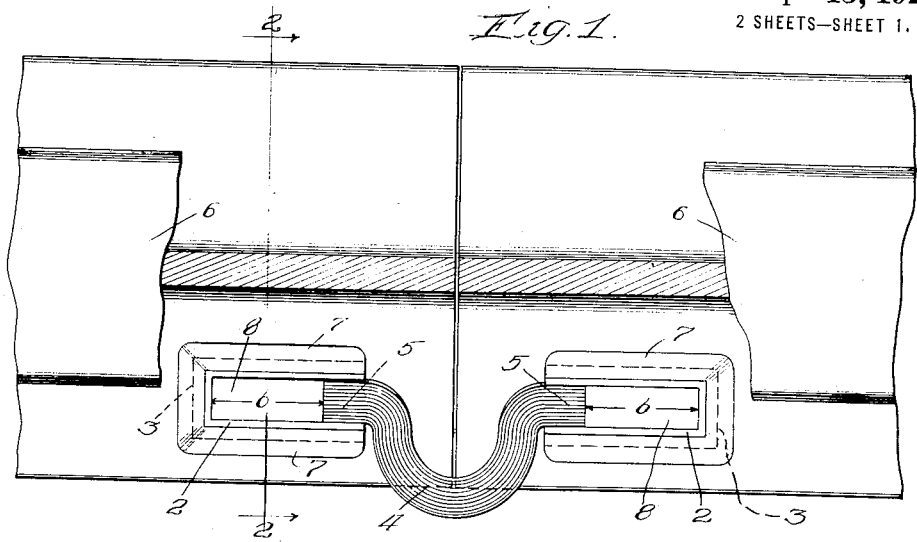
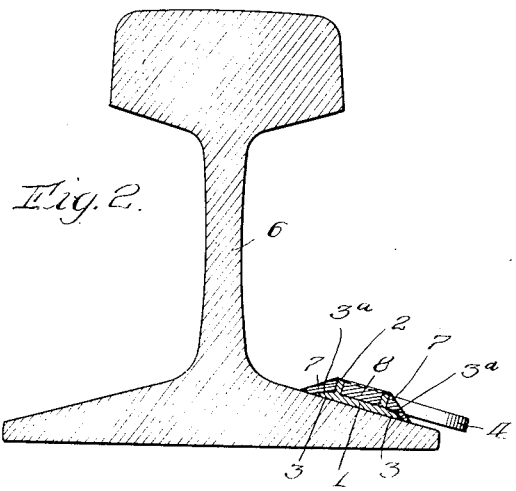
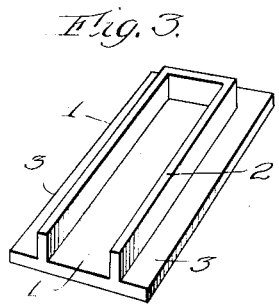 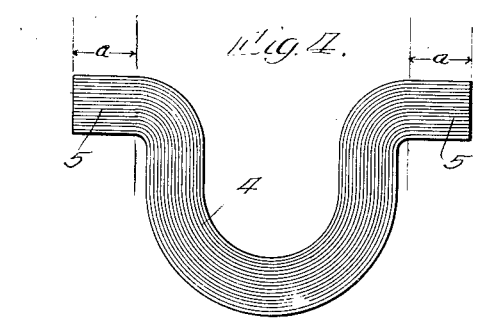 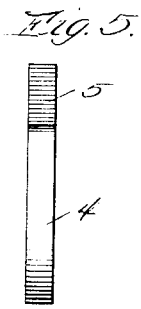
Inventor,
W<sup>m</sup> C. Starkey.

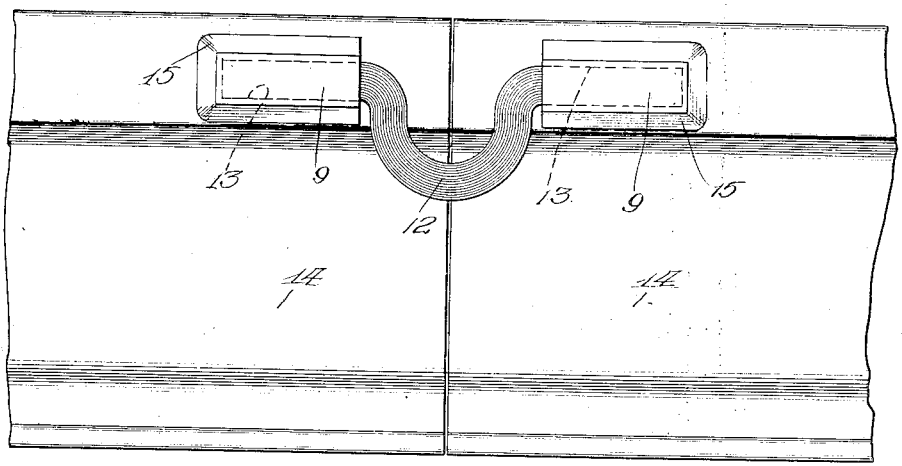
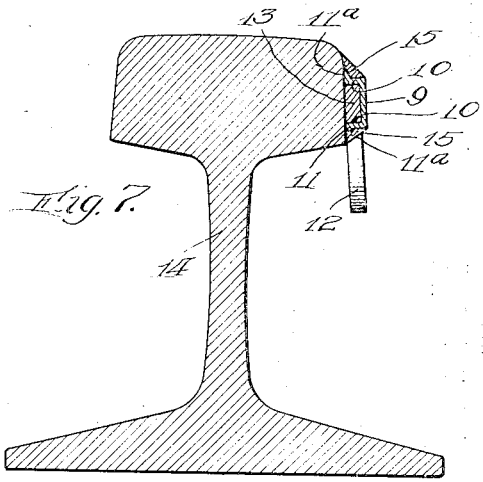
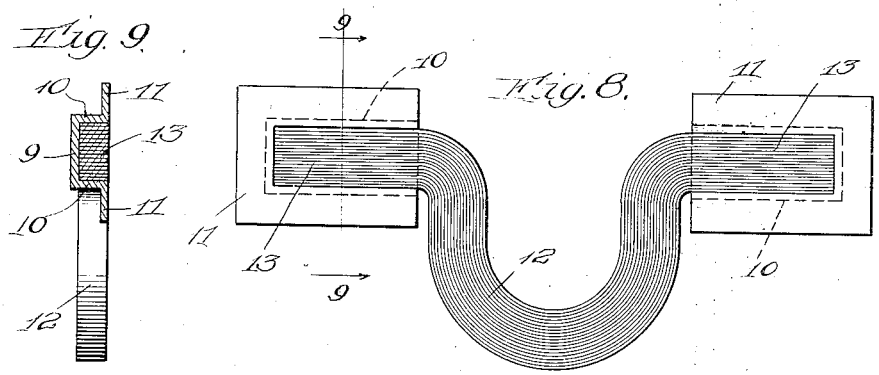

UNITED STATES PATENT OFFICE.

WILLIAM CARLETON STARKEY, OF MANSFIELD, OHIO, ASSIGNOR TO THE OHIO BRASS COMPANY, OF MANSFIELD, OHIO, A CORPORATION OF NEW JERSEY.

METHOD OF APPLYING RAIL-BONDS.

1,336,931.  Specification of Letters Patent.  Patented Apr. 13, 1920.

Application filed June 26, 1916. Serial No. 105,943.

*To all whom it may concern:*

Be it known that I, WILLIAM C. STARKEY, a citizen of the United States, residing at Mansfield, in the county of Richland and State of Ohio, have invented certain new and useful Improvements in Methods of Applying Rail-Bonds, of which the following is a specification.

This invention relates to the bonding of rails for increasing their electrical conductivity. Among the objects of my invention are to construct a bond which is applied to a rail by an intense heating flame, such as oxy-acetylene, and at the same time to protect the flexible portion of the bond from the heat; to produce a bond in which the time of contact of the flame with the copper of the bond body is reduced as low as possible; and to produce a bond which is made an integral part of the rail by welding or brazing the bond in place, thereby producing a joint which is highly efficient both electrically and mechanically. Other objects of the invention will appear hereinafter.

The invention consists in the method and manner of assembling rail bonds and applying them to the rail.

In the accompanying drawings: Figure 1 is a plan view of a bond constructed in accordance with the principles of the invention applied to the flanges of two adjacent rails, portions of the heads of the rails being omitted for clearness; Fig. 2 is a sectional view taken on the line 2—2 of Fig. 1; Fig. 3 is a perspective of a metal casing forming a portion of the bond terminal; Fig. 4 is a side elevation of the bond body; Fig. 5 is an end view of the body shown in Fig. 4; Fig. 6 is a side elevation of a bond applied to the heads of two adjacent rails using a modified form of terminal casing; Fig. 7 is a sectional view of the same; Fig. 8 is a side elevation of the bottom of the bond shown in Fig. 6, and Fig. 9 is a section taken on the line 9—9 of Fig. 8.

In applying bonds under a high temperature heating flame, such as the electric arc, oxy-acetylene and the like, where the temperature reaches 6000 degrees F. to 6300 degrees F., it has been found that this high temperature, if applied to copper for any considerable length of time, will oxidize and otherwise destroy the good qualities of forged copper as a strong and efficient electrical conductor, but that this flame can be applied to iron or steel to better advantage without destroying the properties of the iron or steel so quickly. With this in view the various parts of the invention have been so constructed and arranged as to avoid the detrimental effect of the flame directly on the copper in the terminal of the rail bond in applying the bond to the rail.

In order to carry out this invention a casing of iron or steel open on one face and one end, as shown in Fig. 3, is provided, consisting of a bottom plate 1 with an upright rim 2 and a projecting flange 3. A bond body 4 comprises a plurality of layers or strands of copper to form a flexible member, and the ends 5 are welded into a solid homogeneous mass for a distance from the end indicated by the letter *a*. The cross section of this welded end 5 is of the same or slightly less dimensions as the end opening of the casing.

To apply this bond one of the casings shown by Fig. 3 is placed in proper position adjacent the end of each rail 6, preferably on the flange of the rail, although any flat surface is satisfactory. A heating flame is then applied to the angle formed by the upstanding rim 2, the flange 3 of the casing and the adjacent surface of the rail 6, and when the proper temperature has been reached this angular portion is filled in with a welding or attaching metal 7 which is melted by the flame and unites both with the surface of the rail and with the casing. The flame is applied by means of a blow pipe in a manner well known in this art and the welding or attaching metal is usually applied by means of a thin rod or wire which melts and fills in the space at the desired point upon the application of the heated flame thereto. In this operation it may happen that the flange 3 of the casing is melted down at its edge forming an irregular surface, as indicated by the reference numeral 3ª in Fig. 2, but the casing is then firmly attached or welded to the rail and the attaching metal 7 covers the rim 3 so that the melted down condition is neither visible nor objectionable.

With the casing attached in this manner to the rail one welded end 5 of the bond body 4 is placed in the open end of the casing where it substantially fits in cross section leaving a space *b* as shown in Fig. 1, in the casing which must be filled with attaching metal 8 the same as when applying the attaching metal 7 to the outside of the casing. The flame is applied to the bond end when the casing is filled with the attaching metal 8 which immediately melts and unites both with the bond end 5 and the inside face of the rim 2 of the casing thereby making an efficient electrical and mechanical union between the bond body, the casing and the rail. The attaching metal used as shown at 7 and 8 in the drawings is preferably an alloy having a lower melting point than the material of the bond body, such as bronze, which has both high electrical conductivity and is strong mechanically. It will be obvious from the above description that by placing the bond body in position after securely attaching the casing to the rail, the body itself will be subjected to heat for a short time only and hence a minimum injury will result to the bond body, if any at all. Also, the attaching metal being strong and of high electrical conductivity and having a welded union with the rail and the bond end, the device as a whole constitutes a highly efficient electrical joint. A modification of this construction so made as to be applied in a different position but still preserving all the points and substance of the invention, is shown in Figs. 6 to 9. This casing 9 is made of iron or steel having one face and one end open with a projecting rim 10 and a flange 11 extending from the outer edge of the rim. A bond 12 consists of a plurality of copper strips or members to give flexibility of which the ends 13 are welded into solid homogeneous masses of a size to fit the entire interior of the casing 9. These welded ends 13 are then inserted in the casings 9, first heating the parts a little less than the melting point of the copper and subjecting them to a heavy pressure which unites each casing and a bond end securely, so that the finished bond has both ends fastened to casings, as shown in Fig. 8.

This bond is then held at the ends of a pair of rails 14 by any suitable clamping device or other means. As shown in Figs. 6 and 7 the bond is applied to the heads of the rails. A heating flame is applied to the angle formed by the rim 10, flange 11 and the adjacent face of the rail until the surfaces are brought to a temperature equal or approaching the melting point. Welding or attaching metal 15 in the form of a small rod or wire is then applied to the heated parts which melts and flows or alloys with the parts heated, forming an integral union of the parts and filling the angle with the metal 15, as clearly shown in Fig. 7. The flange 11 of this casing may be melted and reduced in section to a certain extent at different points around the edge but this is of no disadvantage as it is found that sufficient flange remains to unite with the attaching metal thus anchoring the terminal fixedly in place. That part of the casing in contact with the copper body does not melt as readily as the flange 11 because of the high heat conducting property of the copper which carries away or distributes the heat.

In constructing the bond shown by Figs. 6 to 9, it may not be necessary to weld the ends of the bond body 12 into a homogeneous mass before placing them in the casing 9 and the ends of the bond strips or members may be simply placed in the casing and then brought to a welding heat; by compression the layers or members of the bond may then be united into a solid mass and also united with the casing and then applied to the rail as described.

It is obvious that other constructions and methods of uniting and applying may be adopted without departing from the spirit of the invention.

With this construction it is obvious that the amount of metal, and particularly the amount of copper contained in a bond, is reduced to a minimum. It is customary to provide bonds of this class with copper terminals which are of considerably greater cross section than the bond itself and are therefore very heavy and expensive. By providing a metal casing of steel or iron not only is a highly efficient bond produced but the amount of copper in the bond is greatly reduced and the wastage is reduced to a minimum.

I claim:

1. The method of attaching a bond body to a rail by means of a heating flame which consists of attaching to said rail a casing having a higher melting point than the bond body and subsequently attaching the bond body to said casing.

2. The method of attaching a copper bond to a rail which comprises the steps of securing a ferrous casing to the rail, by means of an attaching metal applied to the said rail and casing by the use of a heating flame, and securing said bond in said casing after said casing has been attached to said rail.

3. The method of securing a bond to a rail comprising the steps of attaching to said rail a casing having a higher melting point than said bond and attaching a conductor to said casing, said casing being secured to said rail by an attaching metal fused to said casing and rail by the use of a heating flame, the flame being permitted to act directly only on said attaching metal, casing and rail during the attachment of said casing to said rail.

4. The method of attaching a bond to a rail which consists of attaching to said rail a casing for the end of a conductor, and attaching said conductor to said casing, said rail and casing being secured together by an attaching metal fused to said casing and rail by a heating flame, said attaching metal and heating flame being applied directly only to said attaching metal, casing and rail during the process of attaching said casing to said rail so that said bond is not injured by the high temperature necessary for the attachment of said casing to said rail.

5. The method of attaching a bond to a rail which consists in attaching to said rail, a casing for the end of said bond, which casing has a higher melting point than said bond, said casing being secured to said rail by an attaching metal applied to said casing and rail by a heating flame, inserting the end of said bond loosely in said casing and securing said bond in position in said casing by an attaching metal applied thereto by a heating flame.

6. The method of attaching a bond to a rail which consists in attaching to said rail a casing for the end of said bond, said casing being secured to said rail by an attaching metal fused to said casing and rail by a heating flame applied to said casing and rail but not directly to said bond during the attaching of said casing to said rail; positioning said bond loosely in said casing and attaching said bond in said casing by an attaching metal applied to said bond and casing by a heating flame.

7. The method of securing a bond to a rail comprising the steps of attaching to said rail a casing having a higher melting point than said bond, said casing being secured to said rail by an attaching metal having a lower melting point than either said bond or casing, said attaching metal being fused to said casing and rail by a heating flame, said flame being applied so that it does not act directly upon said bond during the attaching of said casing to said rail; inserting said bond loosely in said casing and attaching said bond to said casing by attaching metal having a lower melting point than said bond, said attaching metal being fused to said bond and casing by the use of a heating flame.

8. The method of securing a bond to a rail comprising the steps of attaching to said rail a ferrous casing, said casing being secured to said rail by an attaching metal having a lower melting point than said bond, said attaching metal being fused to said rail and casing by a heating flame; and subsequently securing the end of a bond in said casing by an attaching metal fused to said bond and casing by a heating flame.

9. The method of securing a bond to a rail comprising the steps of attaching to said rail a casing by means of an attaching metal applied thereto by the use of a heating flame and subsequently securing said bond in said casing.

In testimony whereof I have signed my name to this specification in the presence of two subscribing witnesses, on this 20" day of June A. D. 1916.

WILLIAM CARLETON STARKEY.

Witnesses:
G. A. MEAD,
W. A. DARRAH.